United States Patent Office 3,396,963
Patented Aug. 13, 1968

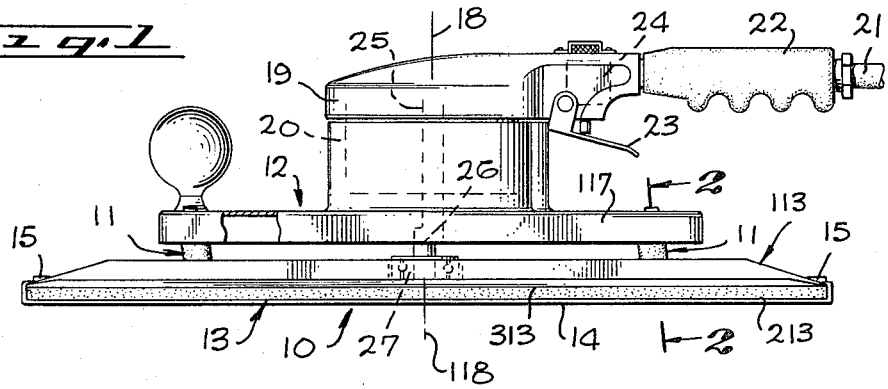

3,396,963
RESILIENT CUSHION STRUCTURE
Alma A. Hutchins, 49 N. Lotus,
Pasadena, Calif. 91107
Filed Dec. 30, 1966, Ser. No. 606,218
20 Claims. (Cl. 267—1)

ABSTRACT OF THE DISCLOSURE

A power sander having a number of cushioning structures connecting a handle section to a power oscillated sandpaper carrying shoe, with each cushioning assembly including a body of elastomeric material having flanges at its opposite ends secured to the handle and shoe respectively by two pairs of gripping elements. Each of the flanges is tightly clamped axially between two of these gripping elements, against the yielding resistance offered by the elastomeric material of the flanges, and in a relation resiliently compressing the elastomeric material to a deformed condition and maintaining it under compression. One of the gripping elements of each pair extends across an end of the elastomeric body and has fingers which extend into engagement with the other gripping element of that pair in a manner holding the two elements in tight gripping engagement with the flange. Also, this finger carrying gripping element has an opening through which a mounting screw extends, in threaded engagement with the gripping element, and with the screw extending beyond the gripping element and into the body of elastomeric material itself.

---

This invention relates to improved resilient cushioning structures to be utilized in mounting a predetermined part for limited resilient motion relative to another part. The cushions of the present invention are in certain respects especially useful for mouting a vibrating or oscillatory shoe of a power sander to the main body of the sander, and will be described primarily as applied to that use.

In certain types of power sanders, it is conventional to connect the sanding shoe to the body of the device by a number of resilient cushion elements usually formed of rubber or other elastomeric material. In such devices, great difficulty has been encountered in forming an effective and permanent connection between each of these elastomeric cushioning elements and the two parts which it cushions. As a result, after a relatively short period of use, the connections between the resilient element and the cushioned parts have had a tendency to tear loose, under the influence of the repeated vibratory motion of the parts, to thus require very frequent replacement or repair of the cushioning elements.

A major object of the present invention is to provide a cushioning structure which is more reliable and permanent in operation, and which in particular is adapted to be anchored in a more effective manner to the cushioned parts, so that in spite of the continual vibratory motion of these parts, relative to one another, the elastomeric cushioning element will remain properly anchored to both of the cushioned parts, and will not be torn away from or disconnected from either of these parts under normal use. Additionally, a cushioning structure embodying the invention is so designed as to be structurally extremely simple and inexpensive to manufacture, to enable practical use of the cushion in situations in which low cost of manufacture is a necessity. Further, a cushion embodying the invention is very easy to assemble, and to connect to the other parts of the cushioned apparatus, and may be easily detached from the connected parts at any time.

Structurally, a cushion embodying the invention includes a cushioning element formed of rubber or other elastomeric material, and having an anchoring portion forming an enlarged head of the elastomeric material. In conjunction with this element, there is employed a structure which grips the enlarged head of the resilient element, and which may in turn be connected to one of the parts to be cushioned, to thus form through this head gripping element an effective connection between the resilient element and the cushioned structure. Preferably, two such heads are provided on the elastomeric element, at its opposite ends, for connection respectively to the two relatively movable cushioned parts of the apparatus. At each of these ends, there may be provided a first connector part received at an outer side of the head, and which is adapted to coact with a second part at the inner side of the head in a manner clamping the head therebetween, preferably by deforming a plurality of fingers formed of one of these parts into retaining engagement with the other part. The final connection to one of the cushioned structures may be formed by means of a screw which connects into one of the parts which grips the head of the elastomeric element.

The above and other features and objects of the invention will be better understood from the following detailed description of the typical embodiment illustrated in the accompanying drawing, in which:

FIG. 1 is a side view of a power sander having cushioning units constructed in accordance with the invention;

FIG. 2 is a transverse essentially vertical section taken on line 2—2 of FIG. 1;

FIG. 3 is an enlarged exploded perspective view showing the different parts of one of the cushioning units prior to their connection together;

FIG. 4 is a greatly enlarged fragmentary vertical section through one of the cushioning units; and FIG. 5 is a perspective view of one of the cushions after assembly.

Referring first to FIG. 1, I have illustrated at 10 a power sander having four resilient cushioning units 11 constructed in accordance with the invention. Sander 10 includes a main rigid and relatively heavy handle body 12, typically formed of an appropriate metal such as aluminum, and which movably carries a shoe section 13, to the underside of which there is mounted a sheet of sandpaper 14, or another appropriate work abrading element. The typically illustrated sandpaper 14 has its opposite ends retained by suitable clips 15 mounted to the upper side of shoe section 13. The shoe may include a channel shaped main element 113 formed of an appropriate rigid material, such as aluminum or the like, and to the underside of which there may be detachably connected a replaceable unit consisting of a layer of rubber cushioning material 213 bonded to and carried by a metal sheet 313.

Handle body 12 has a horizontal portion 16, which may have a depending peripheral skirt 117, and which extends parallel to and in spaced relation to a horizontal rigid plate portion 17 of element 113. The four cushioning units 11 resiliently connect plate portion 17 of the shoe, and metal sheet 313, to horizontal portion 16 of handle body 12, in a manner enabling limited circular oscillatory motion of shoe 13 relative to the handle body, and about a vertical axis 18 of the sander. Projecting upwardly from horizontal portion 16 of the handle body, this body has a hollow portion 19 containing a motor 20 which is desirably pneumatically actuated by compressed air fed to the device through an inlet line 21 leading into a hollow tubular handle grip projection 22. The motor is started and stopped by finger actuation of a lever 23, which operates a valve 24 in the handle body. Motor 19 has a driven shaft 25, which turns about vertical axis 18, and which carries at its lower end an eccentric terminal shaft portion 26, which is journalled within a bearing 27 rigidly connected to shoe 13 for rotation in that bearing about an axis 118 offset eccentrically with respect to and parallel to axis 18. Thus, powered rotation of the motor shaft 25 acts to oscillate shoe 13 circularly relative to handle body 12 about axis 18.

With reference now to FIG. 2, there are provided at each end of portion 16 of the handle body a pair of the mentioned cushioning units 11, which units are connected at their upper ends to portion 16 of the handle body, and at their lower ends to portion 17 of the shoe part 113, by screws 28. Each unit 11 includes a resiliently deformable cushioning element proper, designated 29, and which is formed of a suitable rubber or other elastomeric material. This cushioning element 29 preferably initially has the configuration illustrated in FIG. 3, including an externally cylindrical main portion 30 which, prior to its attachment to the other parts of the apparatus, may be centered about an axis such as that illustrated at 31 in FIG. 3. At the upper and lower ends of portion 30, each cushioning element 29 has two enlarged diameter heads or flanges 32 and 33, which may also be of circular cross section and centered about axis 31. More specifically, heads 32 and 33 may have outer cylindrical surfaces 34, transverse planar outer end faces 35 and 36 disposed perpendicular to axis 31, and axially inner annular shoulder surfaces 37 and 38, also disposed perpendicular to axis 31 in the normal condition to which element 29 tends to return by its own resilience.

Above upper enlarged head or flange 32 of cushioning element 29, there is provided a first connector part 39, desirably formed of a rigid sheet metal, such as steel, defining a planar horizontal circular main portion 40 of connector part 39 having a plurality of connecting fingers 41 projecting from the periphery of that portion. These fingers 41 may be initially shaped to the configuration illustrated in broken lines in FIG. 4, and at the time of the assembly of each cushioning unit 11 may be deformed to the full line holding position illustrated in FIG. 4, to then be retained by their own stiffness in that deformed holding condition. At the underside of upper head 32 of each cushioning element 29, there is provided an annular ring 42, having an internal diameter corresponding substantially to the external diameter of main portion 30 of element 29, and having an external diameter somewhat greater than the normal diameter of outer surface 34 of head 32. This ring or washer 42 may be formed of stiff sheet material, such as steel, and preferably curves gradually downwardly as it advances radially outwardly, to provide a shape capable of being forced axially past head 32 upon initial application of ring 42 to the cushioning element 29.

When fingers 41 of the first connector part 39 are deformed from their broken line position of FIG. 4 to their full line position of that figure, the radially inwardly projecting angular inclined terminal portions 43 of the fingers engage the underside or axially inner side of the periphery of the ring or second connector part 42, to thus exert an upward force against ring 42, in a manner clamping parts 39 and 42 axially together against the periphery of head 32, to tightly grip that head and preferably bulging it slightly radially outwardly as seen in FIG. 4. During this deformation of fingers 41, the two parts 39 and 42 may be urged relatively toward one another in any convenient manner. It is also noted that the portions 44 of fingers 41 provide inclined angularly disposed outer camming surfaces against which a deforming tool may exert force downwardly in a manner actuating the fingers radially inwardly in response to such downward force.

At its center, the main flat circular portion 40 of connector part 39 contains an opening 45, whose inner edge 46 is stamped to a helical shape in a manner forming a single turn thread into which one of the connecting screws 28 is connectible in threaded relation. Adjacent opening 45, the material of circular portion 40 of connector part 39 is deformed downwardly at 47, so that upward forces exerted by the screw act to tighten the thread edge 46 onto the screw in locking fashion. A small radially extending cut 48 may be formed in the inner edge portion of connector part 39, to enable the desired shaping of edge 46 to helical configuration. When parts 39 and 42 are connected to element 29, the downwardly deformed central portion 47 of part 39 may deform the central portion of the upper surface 35 of element 29 downwardly slightly, as illustrated in FIG. 4.

At the lower end of each cushioning element 29, there are provided two additional connector parts 39a and 42a which may be identical with the previously discussed parts 39 and 42, and which act to grip and form an effective connection with the bottom enlarged head 33 of element 29 in the same manner that the discussed top connection to upper head 32 is formed.

After the four cushioning units 11 have been assembled as discussed, with parts 39, 42, 39a and 42a connected to opposite ends of the rubber or other elastomeric cushioning element 29, units 11 are positioned as shown in FIG. 1, and the screws 28 are inserted through openings in portion 16 of handle body 12, and through openings in parts 113 and 313 of shoe 13, and into engagement with the threads 46 formed by connector parts 39 and 39a of the various cushioning units. As each of the screws is turned, it advances into tight engagement with the corresponding thread 46 of the cushioning unit, while at the same time the tapered end of the screw forces its way into the elastomeric material of cushioning element 29. The screws are tightened to a condition in which they hold flat circular portions 40 of the various connector parts 39 tightly against the undersurface of portion 16 of the handle body, and the upper surface of portion 17 of shoe 13. Thus, the upper end of each of the cushioning elements 29 is very positively secured to the handle body, while the lower end of each cushioning element is just as positively and permanently secured to shoe 13.

When the tool is in use, cushioning elements 29 deform continually as shoe 13 oscillates relative to handle body 12 about axis 18, to perform the desired sanding operation. At the same time, these cushioning elements act to hold the shoe in a proper spaced relation with respect to the handle body, and in a proper essentially parallel orientation, to thus in effect limit the relative motion of the shoe to the desired oscillatory movement. It is found that even with very extended and continual operation of the apparatus, the discussed unique connections formed between cushioning units 11 and the two interconnected parts (handle body 12 and shoe 13) remain intact and are not adversely affected by this oscillatory movement. The threads formed by edges 46 of the sheet metal of connector parts 39 and 39a have a self locking action, as mentioned, to prevent detachment of the parts under the vibratory conditions. Further, this locking action is enhanced by extension of the ends of the screws into the initially solid end portions of cushioning elements 29, in frictional locking relation.

I claim:

1. An assembly comprising a body of resiliently deformable elastomeric material having a flange formed of said elastomeric material projecting laterally beyond an adjacent portion of said body, and two relatively movable structures connected to said elastomeric material at different locations and relatively cushioned thereby, one of said structures including two gripping elements at opposite axial sides of said flange tightly clamping and gripping said flange axially therebetween against the yielding resistance offered by said elastomeric material and in a relation resiliently compressing the elastomeric material 2. An assembly as recited in claim 1, in which said gripping elements include a first gripping element at an axially outer side of said flange, a second gripping element extending about said elastomeric body at an axially inner side of the flange, and fingers on one of said elements extending to an oposite side of the other element and exerting force thereagainst in a relation clamping said elements axially together tightly enough to resiliently deform said flange.

3. An assembly as recited in claim 2, in which said first gripping element contains an opening forming a thread, there being a screw adapted to extend into said opening in threaded engagement therewith for attaching said first gripping element to another member.

4. An assembly as recited in claim 1, in which said elastomeric body has two of said flanges at opposite ends thereof, each of said structures including a pair of said gripping elements at opposite axial sides of a corresponding one of said flanges and tightly clamping and gripping said corresponding flange and maintaining it under compression.

5. An assembly as recited in claim 1, in which said gripping elements include a first gripping element at an axially outer side of said flange, and a second gripping element which is essentially annular and disposed about a reduced transverse dimension portion of the body at an axially inner side of the flange, one of said elements having portions projecting to positions of engagement with the other element to clamp the elements toward one another and against the flange, said annular second element having a portion which bears axially against the flange in a direction toward said first element and shaped to advance gradually axially away from said first element as it advances radially outwardly.

6. An assembly as recited in claim 1, in which said gripping elements include a first gripping element extending across one end of the elastomeric body and across an axially outer side of said flange, and an essentially annular second gripping element extending about a reduced transverse dimension portion of the body at an axially inner side of the flange, said first element having fingers projecting past the outer edge of said flange to the axially inner side of said second element and clamping said second element toward the first element to grip said flange tightly therebetween, said first element containing an opening at essentially its center forming a thread, there being a screw adapted to extend through another member and into said opening and connect to said thread.

7. An assembly comprising a body of resiliently deformable elastomeric material having a flange formed of said elastomeric material projecting laterally beyond an adjacent portion of said body, and two relatively movable structures connected to said elastomeric material at different locations and relatively cushioned thereby, one of said structures including two elements at opposite axial sides of said flange confining and retaining said flange therebetween, a first of said elements having a projection extending to a position of engagement with the opposite axial side of the second element in a relation urging said elements toward one another to retain the flange therebetween, said projection being shaped to deflect said second element progressively toward said first element and into tight engagement with the flange in response to radially inward deformation of the projection during assembly of the tool.

8. An assembly as recited in claim 7, in which said projection in extending from said first element to said position of engagement with said second element advances past an outer edge of said flange, and first advances at an outward angle progressively radially outwardly as it advances axially, and then advances at an inward angle progressively radially inwardly as it advances axially at the position of engagement with the second element.

9. An assembly comprising a body of resiliently deformable elastomeric material having a flange formed of said elastomeric material projecting laterally beyond an adjacent portion of said body, and two relatively movable structures connected to said elastomeric material at different locations and relatively cushioned thereby, said structures including two elements at opposite axial sides of said flange confining and retaining the flange therebetween, one of said elements extending across an end of the elastomeric body and containing an opening forming a thread, and a screw for securing said one element to another member and extending through said opening in engagement with said thread and having a threaded end screwed into and contacting said elastomeric material.

10. An assembly comprising a body of resiliently deformable elastomeric material having two essentially annular flanges at opposite ends thereof each projecting laterally beyond an adjacent portion of said body, two pairs of gripping elements engaging and gripping said flanges respectively, each of said pairs of elements including a first gripping element extending across one of said ends of the body to the periphery of one of said flanges, and a second essentially annular gripping element at an axially inner side of the flange, said first element having a plurality of spaced fingers formed thereon and extending generally axially past the periphery of the associated flange and then turned inwardly into engagement with the axially inner side of said second element in a relation urging said elements together and against the flange and tightly clamping and gripping the flange axially therebetween against the yielding resistance offered by the elastomeric material, and in a relation deforming the elastomeric material and maintaining it under compression, and two screws for connecting said two first elements to two coacting members respectively, each of said screws extending into and being threadedly connected to a threaded opening formed in the corresponding one of said first elements.

11. An assembly as recited in claim 10, in which each of said second gripping elements advances progressively away from the associated first gripping element as it advances radially outwardly, and each of said fingers in extending toward the associated one of said second elements first advances at an outward angle to progress radially outwardly as it advances axially, and then advances at an inward angle radially inwardly as it advances axially.

12. An assembly as recited in claim 11, in which said screws have ends which are screwed into and contact said elastomeric material.

13. A sander comprising a handle section to be held by a user, a shoe section for carrying a sheet of sandpaper, motor means for oscillating said shoe section relative to said handle section, and a plurality of cushioning assemblies movably and resiliently connecting said shoe section to said handle section, each of said cushioning assemblies comprising a body of resiliently deformable elastomeric material having a flange of said elastomeric material projecting laterally beyond an adjacent portion of said body near one end, and a connecting structure attaching said flange to one of said sections, said connecting structure including two gripping elements at opposite axial sides of said flange tightly clamping and gripping said flange axially therebetween against the yielding resistance offered by said elastomeric material and in a relation resiliently compressing the elastomeric material to a deformed condition and maintaining it under compression.

14. A sander as recited in claim 13, in which said gripping elements include a first gripping element at an axially outer side of said flange, a second gripping element extending about said elastomeric body at an axially inner side of the flange, and fingers on one of said elements extending to an opposite side of the other element and exerting force thereagainst in a relation clamping said elements axially together tightly enough to resiliently deform said flange.

15. A sander as recited in claim 13, in which said elastomeric body has two of said flanges at opposite ends thereof, there being two of said connecting structures securing said flanges to said handle section and said shoe section respectively and each including a pair of said gripping elements tightly clamping and resiliently compressing the respective flange.

16. A sander as recited in claim 13, in which said elastomeric body has two of said flanges at opposite ends thereof, there being two of said connecting structures securing said flanges to said handle section and said shoe section respectively and each including a pair of said gripping elements tightly clamping and resiliently compressing the respective flange, each of said pairs of gripping elements including a first element disposed across an end of the body and containing a threaded mounting opening, a second element disposed about the body at the axially inner side of the respective flange, and fingers formed on and integral with said first element and extending into engagement with the axially inner side of the second element in a relation clamping said elements tightly against the flange, there being two screws extending through apertures in said two sections respectively and through said openings in said first gripping elements respectively in threaded engagement therewith.

17. A sander as recited in claim 16, in which said fingers in advancing toward said second element first advance angularly radially outwardly as they advance axially and then advance angularly radially inwardly as they advance axially at the location of contact with said second element.

18. A sander as recited in claim 17, in which each of said second elements is an essentially annular washer which advances axially away from the associated first element as it advances radially outwardly.

19. A sander comprising a handle section to be held by a user, a shoe section for carrying a sheet of sandpaper, motor means for oscillating said shoe section relative to said handle section, and a plurality of cushioning assemblies movably and resiliently connecting said shoe section to said handle section, each of said cushioning assemblies comprising a body of resiliently deformable elastomeric material having a flange of said elastomeric material projecting laterally beyond an adjacent portion of said body near one end, and a connecting structure attaching said flange to one of said sections, said connecting structure including two elements at opposite axial sides of said flange confining and retaining said flange therebetween, a first of said elements having a portion extending to a position of engagement with the opposite axial side of the second element in a relation urging the elements toward one another to retain the flange, said portion of said first element being shaped to deflect said second element progressively toward said first element and against the flange upon and as a result of radially inward deformation of said portion during assembly of the tool.

20. A sander comprising a handle section to be held by a user, a shoe section for carrying a sheet of sandpaper, motor means for oscillating said shoe section relative to said handle section, and a plurality of cushioning assemblies movably and resiliently connecting said shoe section to said handle section, each of said cushioning assemblies comprising a body of resiliently deformable elastomeric material having a flange of said elastomeric material projecting laterally beyond an adjacent portion of said body near one end, and a connecting structure attaching said flange to one of said sections, said connecting structure including two elements at opposite axial sides of said flange confining and retaining the flange therebetween, one of said elements extending across said one end of the elastomeric body and containing an opening forming a thread, and a screw securing said one element to one of said sections and extending through said opening in engagement with said thread and having an end screwed into and contacting said elastomeric material.

References Cited

UNITED STATES PATENTS

| | | | |
|---|---|---|---|
| 2,639,564 | 5/1953 | Atkin | 51—170.5 |
| 2,893,174 | 7/1959 | Jepson | 51—170.5 |
| 2,969,656 | 1/1961 | Reuter | 267—63 |

FOREIGN PATENTS 198,964  8/1958  Austria.

ARTHUR L. LA POINT, *Primary Examiner.*

R. M. WOLHFARTH, *Assistant Examiner.*